United States Patent [19]
Baxter, Jr.

[11] Patent Number: 5,320,586
[45] Date of Patent: Jun. 14, 1994

[54] LOCKING LIMITED SLIP PLANETARY TRANSFER CASE

[75] Inventor: Ralph W. Baxter, Jr., Fort Wayne, Ind.

[73] Assignee: Dana Corporation, Toledo, Ohio

[21] Appl. No.: 999,593

[22] Filed: Dec. 31, 1992

[51] Int. Cl.$^5$ .............................................. F16H 1/44
[52] U.S. Cl. ...................................... 475/88; 475/249; 192/59
[58] Field of Search .................... 475/84, 88, 116, 118, 475/248, 249, 252; 192/59, 85 A, 103 F; 180/249

[56] References Cited

U.S. PATENT DOCUMENTS

| | | | |
|---|---|---|---|
| 2,293,731 | 8/1942 | Frederickson | 192/59 |
| 2,370,640 | 3/1945 | Deardorff et al. | 192/59 |
| 3,546,969 | 12/1970 | Gibson et al. | 475/88 |
| 3,899,938 | 8/1975 | Crabb | 475/249 |
| 4,012,968 | 3/1977 | Kelbel | 475/88 |
| 4,445,400 | 5/1984 | Sullivan et al. | 475/88 |

FOREIGN PATENT DOCUMENTS

WO88/10378 12/1988 PCT Int'l Appl. .................. 475/88

*Primary Examiner*—Dirk Wright
*Attorney, Agent, or Firm*—MacMillan, Sobanski & Todd

[57] ABSTRACT

A locking limited slip planetary differential for the transfer case of an all-wheel drive vehicle. First and second coaxially juxtaposed sun gears are mounted to first and second output shafts, respectively, for rotation therewith. A plurality of first planet gears are rotatably mounted on a carrier, each of which meshes with the first sun gear. A plurality of second planet gears is also rotatably mounted on the carrier. Each of the second planet gears meshes with the second sun gear and with an associated one of the first planet gears. A hydraulically actuated clutch pack is provided for selectively connecting the carrier to the first sun gear to limit relative rotation between the first output shaft and the second output shaft. The clutch pack is actuated by a swash plate pump mechanism provided on the first and second sun gears which supplies hydraulic fluid to the clutch pack when the first and second sun gears rotate relative to one another.

13 Claims, 2 Drawing Sheets

LOCKING LIMITED SLIP PLANETARY TRANSFER CASE

BACKGROUND OF THE INVENTION

1. Field of the Invention

The invention relates to a transfer case for all-wheel drive vehicles and, more particularly, to a transfer case which is provided with a self actuated, locking limited slip planetary differential. 2. Summary of Related Art It is well known that all-wheel drive vehicles conventionally employ front and rear driving axles having front and rear differentials, respectively, drivingly connected to front and rear pairs of wheels through a transfer case including a third, inter-axle differential powered by the vehicle engine. Thus, should either the front or the rear drive axle experience a low friction condition, high torque could not be transmitted to the other wheel due to the constitution of the inter-axle differential. To avoid this, there is provided a differential lock up or limiting mechanism which effects a torque transfer to the drive axle in the higher friction condition, thus increasing the total available tractive force for propelling the vehicle and thereby improving the mobility and performance thereof.

To this end, the transfer cases employed previously have typically included a viscous coupling, or an electronically controllable clutch mechanism which may vary the amount of clutch force applied. Such mechanisms have generally performed adequately, but are unduly complex.

SUMMARY OF THE INVENTION

The present invention relates to a locking limited slip planetary differential for the transfer case of an all-wheel drive vehicle. The transfer case comprises an outer housing having first and second output shafts mounted therein for rotation relative thereto. First and second coaxially juxtaposed sun gears are mounted to the first and second output shafts, respectively, for rotation therewith. A planetary carrier is also rotatably mounted within the outer housing. A plurality of first planet gears are rotatably mounted on the carrier, each of which meshes with the first sun gear. A plurality of second planet gears is also rotatably mounted on the carrier. Each of the second planet gears meshes with the second sun gear and with an associated one of the first planet gears.

A hydraulically actuated clutch pack is provided for selectively connecting the carrier to the first sun gear to limit relative rotation between the first output shaft and the second output shaft. The clutch pack is actuated by a swash plate pump mechanism provided on the first and second sun gears which supplies hydraulic fluid to the clutch pack when the first and second sun gears rotate relative to one another. The present invention thus provides a relatively simple means of limiting relative rotation between the front and rear drive shafts of an all-wheel drive vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
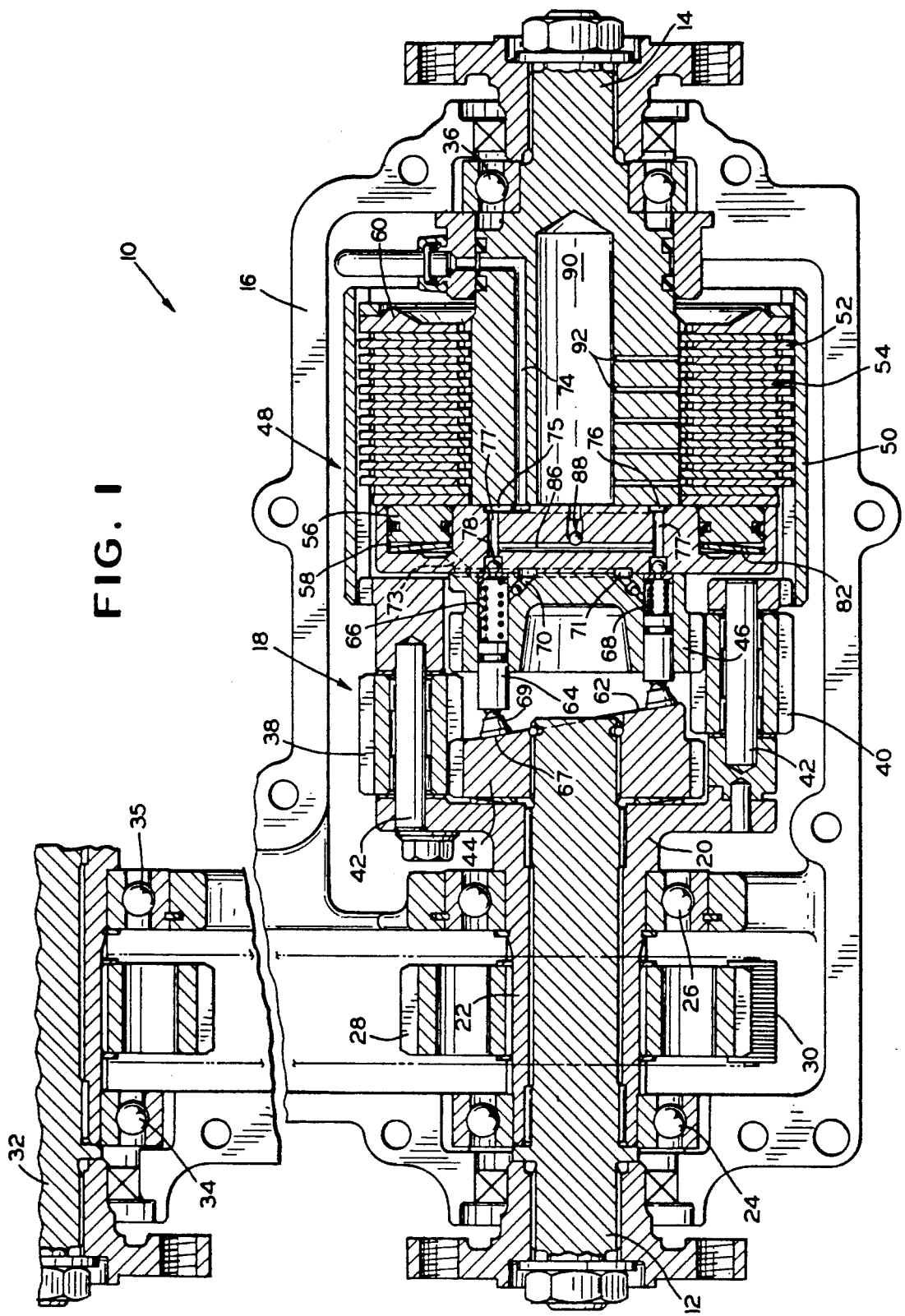
FIG. 1 is a sectional plan view of the invention taken along its centerline, except for the planetary gear assembly which is taken along a line intersecting the centers of a first planet gear, the planetary carrier, and a second planet gear.

Referring now to FIG. 1, there is illustrated a transfer case, generally designated 10, which provides a driving connection between the vehicle engine and coaxially aligned front and rear output shafts 12 and 14. The output shafts 12 and 14 extend into an outer housing 16 of the transfer case 10. The outer housing 10 is nonrotatably mounted on a vehicle in the conventional manner.

A planetary differential assembly 18 is disposed within the outer housing 16 and between the front output shaft 12 and the rear output shaft 14. The planetary differential assembly 18 includes a planetary carrier 20 which is rotatably mounted within the outer housing 16. A hub section 22 of the carrier 20 is journalled in a pair of axially spaced bearings 24 and 26, and the end of the front output shaft 12 is journalled inside the hub section 22 for rotation relative thereto. The hub section 22 also carries a sprocket wheel 28 which is connected by a chain 30 or other suitable means to an input shaft 32 rotatably mounted in the outer housing 16 on bearings 34 and 35. The rear output shaft 14 is rotatably mounted in the outer housing 16 by bearing 36.

Meshed pairs of planet gears, first planet gears 38 and second planet gears 40, are rotatably mounted on parallel pins 42 secured to the carrier 20. The carrier 20 is preferably provided with 3 meshed pairs of planet gears. Each of the first planet gears 38 meshes with a first sun gear 44 which is mounted to the end of the front output shaft 12 for rotation therewith. Each of the second planet gears 40 meshes with a second sun gear 46 which is mounted to the end of the rear output shaft 14 for rotation therewith. Each of said second planet gears 40 also meshes with an associated one of said first planet gears 38.

A hydraulically operated clutch assembly 48 is incorporated in the differential to provide a variably controllable resistance to the relative rotation of the front and rear output shafts 12 and 14. The clutch assembly 48 includes a clutch pack comprised of a plurality of laterally movable annular clutch discs concentrically stacked together side by side. The clutch pack is disposed within an internally splined sleeve 50 extending from and formed integrally with the carrier 20. The outer interleaved clutch discs 52 are splined on their outer periphery to the inner periphery of the sleeve 50, while the inner interleaved clutch discs 54 are splined on their inner periphery to external splines provided on the second sun gear 46.

An annular piston 56 is reciprocably mounted in an annular chamber 58 to selectively compress the inner and outer clutch discs 52 and 54 against a clutch backup plate 60 to vary the degree of actuation of the clutch assembly 48. Thus, when actuated, the clutch assembly 48 connects the carrier 20 to the second sun gear 46 to limit the relative rotation between the first output shaft 12 and the second output shaft 14. As will be appreciated, by clutching the carrier 20 to the second sun gear 46, the first planet gears 38, and therefore the meshing second planet gears 40, will be prevented from rotating about the pins 42. Accordingly, the first sun gear 44, which meshes with each of the first planet gears 38, and the second sun gear 46 will rotate at the same speed. The front and rear output shafts 12 and 14, which are connected to the first and second sun gears, respectively, will therefore also rotate at the same speed.

The control means for the clutch assembly 48 is comprised of a differential rotational speed responsive means for generating pressurized fluid, which is then communicated to the annular chamber 58 to force the piston 56 against the adjacent face of the clutch pack, compressing the clutch pack between the piston 56 and the back-up plate 60. The speed responsive means comprises a swash plate pump mechanism which operates in response to the differential rotation of the front and rear output shafts 12 and 14, and therefore of the first and second sun gears 44 and 46.

The swash plate pump mechanism of the present invention includes a swash plate or cam face 62 positioned on the end of the first sun gear 44 and rotatable therewith. A plurality of pump pistons 64 are reciprocably mounted parallel to the axis of the output shaft 14 in circumferentially spaced bores 66 formed in the second sun gear 46. Each of the pistons 64 is continuously urged against the swash plate 62 of the first sun gear 44 by a spring 68 disposed within the bore 66. In a preferred embodiment, the distal ends of the pump pistons 64 are provided with a swash plate engaging face 67 mounted on a ball and socket joint 69 which allows the entire engaging face 67 to maintain contact with the swash plate in the event the first and second sun gears 44 and 46 rotate relative to one another.

It will be appreciated that when the first sun gear 44 rotates relative to the second sun gear 46, the swash plate 62 causes the pump pistons 64 to reciprocate within the bores 66. The reciprocation of the pump pistons 64 forces hydraulic fluid from the bores 66 through the check valves 70 to an annular chamber 71 which communicates with the annular chamber 58 via the passage 73, thereby actuating the clutch assembly 48. The greater the relative rotation between the first and second sun gears 44 and 46, the greater the pressure of the hydraulic fluid.

Figure 2:
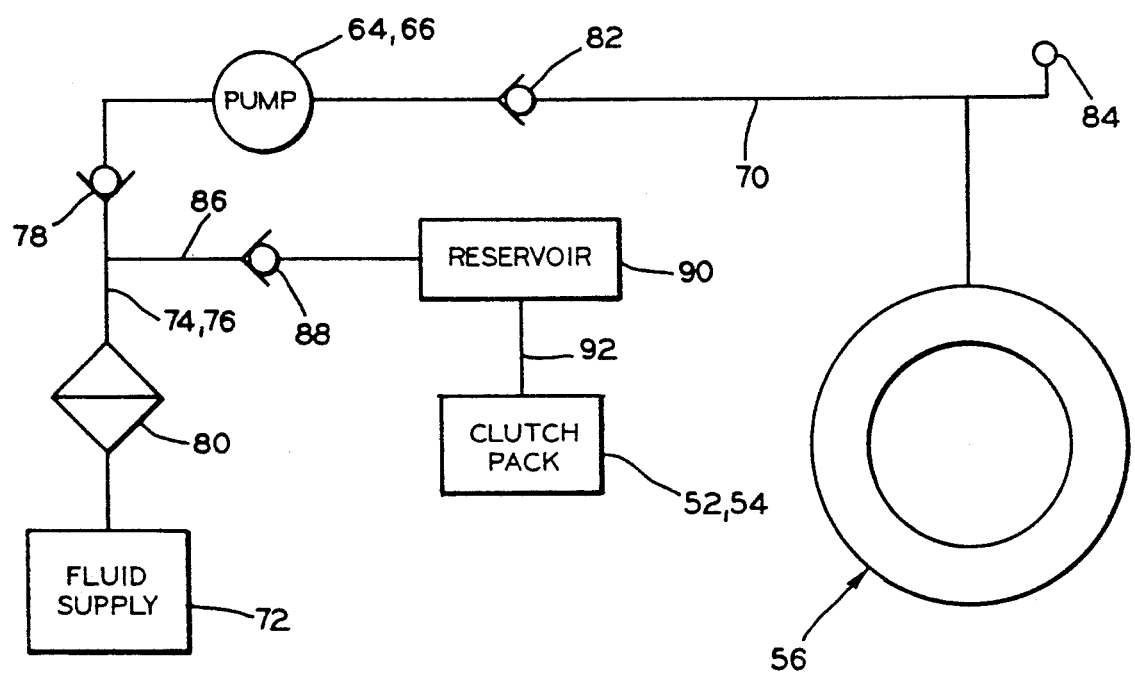
FIG. 2 is a hydraulic circuit of a pump mechanism employed in the locking limited slip planetary transfer case.

FIG. 2 illustrates the hydraulic circuit. The hydraulic fluid is supplied to the bores 66 from a fluid supply 72 by means of passages 74 and 75, annular chamber 76, passages 77 and check values 78. Preferably, the hydraulic fluid is passed through a filter 80 after exiting the fluid supply 72 and before entering the passage 74. As the pump pistons 64 reciprocate, the hydraulic fluid within the bores 66 is pressurized. This causes the check valve 78 to close, while the check valve 70 is caused to open. The pressurized hydraulic fluid flows across the check valve 70 to the annular chamber 71 and through the passage 73 to the annular chamber 58, where it urges the annular piston 56 against the adjacent face of the clutch pack. In a preferred embodiment, a spring 82 is provided in the annular chamber 58 to provide a preloading force to the annular piston 56. A bevel spring is one preferred type of spring for this purpose.

Assuming that the hydraulic fluid is a suitable lubricant, the fluid supply 72 may also be used to feed a lubricant reservoir 90 formed in the second sun gear 46 via passages 86 and check valve 88. The lubricant is then fed to the clutch discs 52 and 54 through conduits 92.

During normal operation, rotation of the input shaft 32 will rotate the carrier 20 by means of the chain 30 and the sprocket wheel 28. The carrier 20 then rotates the first and second sun gears 44 and 46 through the pairs of first and second planet gears 38 and 40. The first sun gear 44 imparts rotation to the front output shaft 12 while the second sun gear 46 imparts rotation to the rear output shaft 14, the front and rear output shafts 12 and 14 rotating at the same speed.

Should either the front or the rear wheels of the vehicle lose traction, either the front or rear output shaft will be caused to speed up, which will also cause either the first or second sun gear to rotate faster than the other. For example, if the front wheels lose traction and the front output shaft 12 rotates faster, the first sun gear 44 will rotate faster than the second sun gear 46. This relative rotation will cause the first and second planet gears 38 and 40 to rotate on the pins 42, causing the second sun gear 46 to rotate in the opposite direction relative to the carrier 20, and slowing or even stopping rotation of the second sun gear 46 (and thus the rear output shaft 14) relative to the outer housing 16.

In the transfer case of the present invention, however, the relative rotation between the first and second sun gears 44 and 46 results in the reciprocation of the pump pistons 64, which actuates the clutch assembly 48. As the clutch assembly 48 is engaged, the carrier 20 is clutched to the second sun gear 46, limiting the relative rotation therebetween. Once the clutch assembly 48 is fully engaged, the carrier 20 is locked to the second sun gear 46, stopping all differential motion, and preventing relative rotation between the front and rear output shafts 12 and 14.

Once relative rotation between the first and second sun gears 44 and 46 ceases, the pump pistons 64 stop reciprocating in the bores 66 and the pressure applied to the hydraulic fluid drops. The hydraulic fluid will then begin to drain from the annular chamber 58 through bleed orifices 84, which begins to disengage the clutch assembly 48. The volume of oil directed to the annular chamber 58 is primarily determined by the speed of relative rotation between the front and rear output shafts 12 and 14. Accordingly, the bleed orifices 84 are suitably sized with regard to the capacity of the oil supply 72 and the displacement of the pump pistons 64 to provide a controlled pressure bleed-off for a given amount of differential rotation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A locking limited slip planetary differential for the transfer case of an all-wheel drive vehicle comprising:
an outer housing;
first and second output shafts mounted in said outer housing for rotation relative thereto;
first and second coaxially juxtaposed sun gears, mounted to said first and second output shafts, respectively, for rotation therewith;
a carrier rotatably mounted within said outer housing;
a plurality of first planet gears rotatably mounted on said carrier, each meshing with said first sun gear;
a plurality of second planet gears rotatably mounted on said carrier, each meshing with said second sun gear and with said first planet gears;

a hydraulically actuated clutch for selectively connecting said carrier to said first sun gear to limit relative rotation between said first output shaft and said second output shaft, said clutch comprising a plurality of interleaved outer and inner clutch discs, said outer clutch discs being splined on their outer periphery to said carrier, said inner clutch discs being splined on their inner periphery to said first sun gear, and said clutch further comprising an clutch backup plate mounted to said carrier and positioned on one side of said clutch discs, and an annular piston reciprocally mounted on the opposite side of said clutch discs in an annular chamber defined in said first sun gear; and a swash plate pump mechanism provided on said first and second sun gears for supplying hydraulic fluid to said clutch when said first and second sun gears rotate relative to one another.

2. A differential as defined in claim 1, wherein said swash plate pump mechanism comprises a swash plate rotatable with one of said first or second sun gears, and a fluid piston pump rotatable with the other of said first or second sun gears, said fluid piston pump engaging said swash plate.

3. A differential as defined in claim 2, wherein said fluid piston pump comprises a plurality of pump pistons reciprocally mounted in a plurality of circumferentially bores formed in said other sun gear, and a plurality of springs disposed within said bores which urge said pump pistons into continuous engagement with said swash plate.

4. A differential as defined in claim 3, further comprising individual swash plate engaging faces mounted on the end of each of said pump pistons by means of a ball and socket joint so that substantially all of each of said engaging faces maintains contact with said swash plate when said first and second sun gears rotate relative to one another.

5. A differential as defined in claim 1, further comprising a spring disposed in said annular chamber for urging said annular piston against said clutch discs to provide a preloading force.

6. A differential as defined in claim 5, wherein said spring is a bevel type spring.

7. A differential as defined in claim 1, further comprising an internally splined sleeve extending from and formed integrally with said carrier, said sleeve being splined to said outer clutch discs.

8. A transfer case for an all-wheel drive vehicle with a locking limited slip planetary differential comprising:
an outer housing;
first and second output shafts journalled in said outer housing for rotation relative thereto;
first and second coaxially juxtaposed sun gears, mounted to said first and second output shafts, respectively, for rotation therewith;
an input shaft journalled in said outer housing for rotation relative thereto;
a carrier connected to said input shaft for rotation therewith;
a plurality of first planet gears rotatably mounted on said carrier, each meshing with said first sun gear;
a plurality of second planet gears rotatably mounted on said carrier, each meshing with said second sun gear and with said first planet gears;
a hydraulically actuated clutch pack for selectively connecting said carrier to said first sun gear to limiting relative rotation between said first output shaft and said second output shaft, said clutch comprising a plurality of interleaved outer and inner clutch discs, said outer clutch discs being splined on their outer periphery to said carrier, said inner clutch discs being splined on their inner periphery to said first sun gear, and said clutch further comprising an clutch backup plate mounted to said carrier and positioned on one side of said clutch discs, and an annular piston reciprocally mounted on the opposite side of said clutch discs in an annular chamber defined in said first sun gear; and
a swash plate pump mechanism provided on said first and second sun gears for supplying hydraulic fluid to said clutch pack when said first and second sun gears rotate relative to one another.

9. A differential as defined in claim 8, wherein said swash plate pump mechanism comprises a swash plate rotatable with one of said first or second sun gears, and a fluid piston pump rotatable with the other of said first or second sun gears, said fluid piston pump engaging said swash plate.

10. A differential as defined in claim 9, wherein said fluid piston pump comprises a plurality of pump pistons reciprocally mounted in a plurality of circumferentially bores formed in said other sun gear, and a plurality of springs disposed within said bores which urge said pump pistons into continuous engagement with said swash plate.

11. A differential as defined in claim 10, further comprising individual swash plate engaging faces mounted on the end of each of said pump pistons by means of a ball and socket joint so that substantially all of each of said engaging faces maintains contact with said swash plate when said first and second sun gears rotate relative to one another.

12. A differential as defined in claim 8, further comprising a spring disposed in said annular chamber for urging said annular piston against said clutch discs to provide a preloading force.

13. A differential as defined in claim 12, wherein said spring is a bevel type spring.

* * * * *